US010263710B2

(12) United States Patent
Aveline et al.

(10) Patent No.: US 10,263,710 B2
(45) Date of Patent: Apr. 16, 2019

(54) ELECTRONIC DEVICE ASSOCIATED WITH A PHOTOVOLTAIC MODULE TO OPTIMISE THE THROUGHPUT OF A BIDIRECTIONAL VLC TRANSMISSION

(71) Applicant: SUNPARTNER TECHNOLOGIES, Rousset (FR)

(72) Inventors: Franck Aveline, Rousset (FR); Emilie Bialic, Rousset (FR); Nicolas Chaumont, Rousset (FR)

(73) Assignee: SUNPARTNER TECHNOLOGIES, Rousset (FR)

( * ) Notice: Subject to any disclaimer, the term of this patent is extended or adjusted under 35 U.S.C. 154(b) by 0 days.

(21) Appl. No.: 15/532,927

(22) PCT Filed: Dec. 2, 2015

(86) PCT No.: PCT/FR2015/000218
§ 371 (c)(1),
(2) Date: Jun. 2, 2017

(87) PCT Pub. No.: WO2016/087725
PCT Pub. Date: Jun. 9, 2016

(65) Prior Publication Data
US 2017/0366276 A1 Dec. 21, 2017

(30) Foreign Application Priority Data

Dec. 2, 2014 (FR) ..................................... 14 02737

(51) Int. Cl.
*H04B 10/54* (2013.01)
*H04B 10/69* (2013.01)
*H04B 10/114* (2013.01)
*H04B 10/116* (2013.01)
*H04B 10/58* (2013.01)

(52) U.S. Cl.
CPC ......... *H04B 10/697* (2013.01); *H04B 10/116* (2013.01); *H04B 10/1141* (2013.01);
(Continued)

(58) Field of Classification Search
CPC ......... H04B 10/69; H04B 10/58; H04B 10/11
See application file for complete search history.

(56) References Cited

U.S. PATENT DOCUMENTS

2010/0084729 A1* 4/2010 Steinbrueck ...... H01L 27/14603
257/434
2012/0171970 A1* 7/2012 Muhammad ......... H04B 1/0458
455/84

(Continued)

FOREIGN PATENT DOCUMENTS

WO  WO 99/31830 A2  6/1999

OTHER PUBLICATIONS

International Search Report (PCT/ISA/210) dated Mar. 15, 2016 by the European Patent Office as the International Searching Authority for International Application No. PCT/FR2015/000218.

(Continued)

*Primary Examiner* — Dzung D Tran
(74) *Attorney, Agent, or Firm* — Buchanan Ingersoll & Rooney PC

(57) ABSTRACT

The invention relates to a bidirectional wireless communication device which is based on the use of light, including emitting modules, each emitting amplitude- and/or phase-modulated light; and a receiving module made up of: a photodetector illuminated by said modulated light and generating a modulated electrical signal in response to said modulated light; and a processing module for processing the signal generated by said photodetector. The receiving module includes an electronic means positioned between the photodetector and the signal-processing module and capable of matching the impedance of the photodetector to maximize the signal-to-noise ratio of the electrical signal by minimizing distortions of said electronic signal associated with incorrect impedance matching at the output of the photode- (Continued)

tector, while maximizing the level of the modulated electrical signal and the throughput of transmitted data.

14 Claims, 4 Drawing Sheets

(52) U.S. Cl.
CPC ......... *H04B 10/1143* (2013.01); *H04B 10/54* (2013.01); *H04B 10/58* (2013.01); *H04B 10/691* (2013.01)

(56) References Cited

U.S. PATENT DOCUMENTS

| | | | |
|---|---|---|---|
| 2014/0291487 A1* | 10/2014 | Laforce | H01L 31/02 250/214 LA |
| 2015/0003843 A1* | 1/2015 | Zhou | H03F 1/56 398/214 |
| 2016/0254898 A1* | 9/2016 | Sjoland | H04B 1/0458 370/281 |

OTHER PUBLICATIONS

Written Opinion (PCT/ISA/237) dated Mar. 15, 2016 by the European Patent Office as the International Searching Authority for International Application No. PCT/FR2015/000218.
Grobe et al., "High-Speed Visible Light Communication Systems", *IEEE Communications Magazine*, Dec. 1, 2013, pp. 60-66, vol. 51, IEEE Service Center, Piscataway, US.

\* cited by examiner

ELECTRONIC DEVICE ASSOCIATED WITH A PHOTOVOLTAIC MODULE TO OPTIMISE THE THROUGHPUT OF A BIDIRECTIONAL VLC TRANSMISSION

TECHNICAL FIELD OF THE INVENTION

The present invention relates to visible or invisible, infrared (IR) and ultraviolet (UV) light communication devices, in the context of the optimization of the throughput of the data transmitted.

STATE OF THE ART

The visible light communication devices (VLC or LiFi, acronyms respectively standing for "visible light communication" and "light fidelity") use the visible light to transmit information between two distant points. The visible light communication systems generally comprise one or more light-emitting diodes (LEDs) forming an emission means and a photodetector forming a reception means. The LED supplies a light signal in the visible whose intensity is modulated as a function of the data to be transmitted. LED luminaires offer the advantage of allowing the dual function of lighting and of data transmission. Their physical characteristics make it possible to consider data transmission throughputs with throughputs of the order of a gigabit per second (Gbit/s).

Such a communication system is advantageous in that it is possible to use as reception means most of the photodetectors associated with an information processing system making it possible to analyze the variation of the amplitude of the light signal received and deduce therefrom the signal transmitted.

There are a number of types of modulations used to transmit, from LEDs, data that can be received by a photodetector, for example:
 a modulation of the light intensity with non-zero mean, the modulation used can then be of NRZ (acronym for "non-return-to-zero") type. This is a two-state coding, the signal is in one state (for example in the high state) when logic 1s are transmitted, and in the other state (in the low state for example) when logic 0s are transmitted. The photodetector then transcribes the intensity of the light signal received into an electrical signal corresponding to the form of the electrical signal which controls the light source.
 a modulation of the intensity with zero mean with the addition of a bias current allowing the lighting function. The modulation used is of OFDM (acronym for "orthogonal frequency-division multi-plexing") type applied to LiFi. It makes it possible to control the illumination via the bias current, the addition of the OFDM signal with zero mean not modifying the level of the illumination. That means that the photodetector then transcribes the variations of the intensity of the light signal received. The photodetector is chosen such that there is no saturation of said detector linked to the intensity of the incident light, for example that from the sun or that from the LED.

If the aim is to simultaneously produce the lighting and data transmission functions, it is necessary on the one hand to bias the LED module from a direct current (direct or DC component), and on the other hand to modulate the intensity of the LED module from a temporal analog signal with zero mean (alternating or AC component). This is why the so-called OFDM LiFi technology is suited to this type of dual function.

A conventional LED-based LiFi communication device comprises:
 a data source (internet for example);
 a specific electronic module making it possible to encode the data of the digital signal as analog signal;
 an LED module;
 in the case of the lighting/transmission function, a specific control means making it possible to add together the bias voltage (or current) and the analog signal containing the data to be transmitted;
 a photodetector capable of detecting the modulated light signal and of transforming it into an electrical signal;
 a signal processing module capable of using the electrical signal generated by the photodetector.

The photovoltaic modules are photodetectors capable of transcribing a modulated light signal into a modulated electrical signal, that is to say corresponding to the variations of the light intensity and assumed representative of the form of the electrical signal which controls the light source. A communication system using photovoltaic modules as reception means is advantageous in that it makes it possible to dispense with the biasing (and therefore an addition of energy) of the photodetector and also makes it possible to consider delivering energy to the electronic components forming said reception means, for example to the signal processing module.

Generally, the photovoltaic modules are optimized to produce the maximum of energy by means of an impedance matching. The literature proposes a large number of solutions on the control algorithm performing a search for the maximum power point (commonly called MPPT, the acronym for "maximum power point tracking") when the photovoltaic module and the load are connected through a solid-state converter. The I-V (intensity over voltage) characteristic of the photovoltaic module depends on the level of illumination, of the temperature and of the aging of said module. However, this I-V characteristic, when the light is modulated, is also a function of the frequency, of the type of modulation and of the associated modulation depth.

In order, at each instant, to extract the best modulated signal, it is necessary to introduce an impedance matching stage between the photovoltaic module and the signal processing module in order to couple the two elements as perfectly as possible; however, the known devices allowing an impedance matching are not suitable (because they are designed to extract the maximum of power), and do not therefore give satisfactory results in terms of faithful translation of the modulated light signal received by the photovoltaic module. When the load impedance of a photovoltaic module is not optimized, the analog electrical signal generated by the photovoltaic module is either too distorted for the information that it contains to be able to be processed, or too weak to be processed by the signal processing module.

Electronic means are known, notably through the document "High-speed visible light communication systems" by GROBE LILIANE ET AL, IEEE Communications Magazine, IEEE Service Center, Piscataway, US, Vol. 51, No. 12, 1 Dec. 2013 (2013 Dec. 1), pages 60-66, for amplifying the signal at the output of the photodetector. In the case where the electrical signal has been correctly restored at the output of the photodetector, the use of a trans-impedance amplifier (TIA) will make it possible to increase the level of the signal and consequently the signal-to-noise ratio (SNR) and therefore potentially the throughput. On the other hand, if the signal has not been correctly restored because, for example, of a poor impedance matching of the photodetector, the TIA, whose function is not to match the impedance in order to correct the distortion of the electrical signal, will only amplify the distorted signal, causing a deterioration of the SNR and therefore of the throughput. The TIA or the equivalent electronic amplification systems therefore do not aim to search for the maximum of SNR because they search only to maximize the level of the signal.

AIM OF THE INVENTION

The main aim of the invention is to describe an electronic device which makes it possible to increase the quality and the level of the electrical signal generated by a photovoltaic module which is illuminated by a modulated light. That makes it possible, on the one hand, to transmit data by this communication mode (VLC) by minimizing the distortion of the signal received and, on the other hand, to dynamically adapt the electrical response of the photovoltaic module as a function of the frequency and/or modulation characteristics of the lights that it receives, in order to increase the throughput of the data transmitted.

SUBJECTS OF THE INVENTION

The subject of the invention relates to a bidirectional wireless communication device based on the use of light, and a number of methods for matching the impedance of said device.

The bidirectional wireless communication device that is the subject of the invention comprises at least:
(a) one or more emission modules, each emission module being composed:
  of a light source powered by a control means and emitting an amplitude- and/or phase-modulated light;
  of a control means which generates an electrical signal deriving from the digital/analog conversion of the source data to be transmitted;
(b) a reception module composed:
  of a photodetector illuminated by said modulated light and generating a modulated electrical signal in response to said modulated light;
  of a processing module for the signal generated by said photodetector capable of communicating with the control means via a return channel;
said wireless communication device is characterized in that the reception module further comprises an electronic means situated between the photodetector and the signal processing module and capable of matching the impedance of the photodetector in order to maximize the signal-to-noise ratio of the modulated electrical signal by minimizing the distortions of said modulated electrical signal linked to a poor impedance matching at the output of the photodetector, while maximizing the level of the modulated electrical signal and the throughput of transmitted data.

According to different embodiments of the device, said photodetector is a photovoltaic module capable of producing an electrical charge or power supply current.

According to different embodiments of the device, the electronic means capable of matching the impedance of the photodetector comprises:
  physical components of variable values, such as capacitors, inductors and/or resistors;
  an electronic module for managing said physical components.

According to a variant embodiment, the electrical signal generated by the control module can comprise a direct component and an alternating component.

According to different embodiments of the device, the modulated light can be an incoherent or coherent light, emitted respectively by a light source such as a light-emitting diode or a laser diode.

According to an additional variant embodiment of the device, said modulated light can be emitted by the light source in wavelength ranges corresponding to the visible, to the ultraviolet and/or to the infrared.

According to a variant embodiment, the source data can be a reference signal or communication data.

In another particular embodiment, the visible light communication device according to the invention comprises a plurality of emission modules which emit modulated lights with different modulation characteristics, the photodetector being incorporated in a mobile object which successively receives one or other of said modulated lights and having an electronic impedance matching means capable of maximizing the throughput of data transmitted by each of said emission modules.

According to a first example of method for matching the impedance of the photodetector of the wireless communication device according to the invention, the procedure is as follows:
(a) the communication is initialized;
(b) an initial impedance value is set using the electronic means, said value being a function of the nature of the photodetector;
(c) a criterion representative of the quality of the electrical signal received which is acceptable for the communication is set, called acceptable quality criterion;
(d) the impedance of the photodetector is adjusted by successive increments so as to maximize the criterion representative of the level of the electrical signal received, as long as the criterion representative of the quality of the electrical signal received is better than the acceptable quality criterion;
(e) the modulated light signal is transmitted containing the communication data.

According to a second example of method for matching the impedance of the photodetector of the wireless communication device according to the invention, the procedure is as follows:
(a) the communication is initialized;
(b) an initial impedance value is set using the electronic means, said value being a function of the nature of the photodetector;
(c) the impedance of the photodetector is adjusted by successive increments so as to improve the criterion representative of the quality of the electrical signal received, said better criterion representative of the quality of the electrical signal received being called optimized quality criterion with an impedance defined as a pre-optimized impedance;
(d) the pre-optimized impedance of the photodetector is adjusted by successive increments so as to maximize the criterion representative of the level of the electrical signal received, as long as the criterion representative of the quality of said electrical signal received is better than the optimized quality criterion;
(e) the modulated light signal is transmitted containing the communication data.

In a particular embodiment of said impedance matching methods, the initialization of the communication consists in transmitting, via the emission module, a header signal associated with a reference signal known to the reception module.

In another particular embodiment of said impedance matching methods, the criterion representative of the quality of the signal transmitted is a characteristic of the Fourier transform, a bit error ratio, a frame error ratio or a packet error ratio of the signal transmitted.

Similarly, the criterion representative of the level of the signal transmitted is a signal-to-noise ratio, a peak-peak amplitude, a maximum amplitude or a minimum amplitude of the signal transmitted.

Finally, the adjustment of the impedance of the photodetector by successive increments so as to reach a targeted criterion comprises steps consisting in:
(a) choosing an incrementation pitch;
(b) measuring the criteria representative of the quality or of the level of the electrical signal received obtained respectively for the reference signal, for the signal received with an impedance equal to the initial impedance plus the incrementation pitch and for the signal received with an impedance equal to the initial impedance minus the incrementation pitch;
(c) comparing the criteria representative of the quality or of the level of the electrical signal received two-by-two, by setting an impedance value corresponding to the targeted criterion and by taking, for new reference signal, the electrical signal received with said impedance value;
(d) repeating the steps of measurement and of comparison of the bit error ratios or of the signal-to-noise ratios by an iterative method, until the targeted criterion is reached by the reference electrical signal.

FIGURES

The invention will be better understood from its detailed description, in relation to the figures, in which.

DETAILED DESCRIPTION

Figure 1:
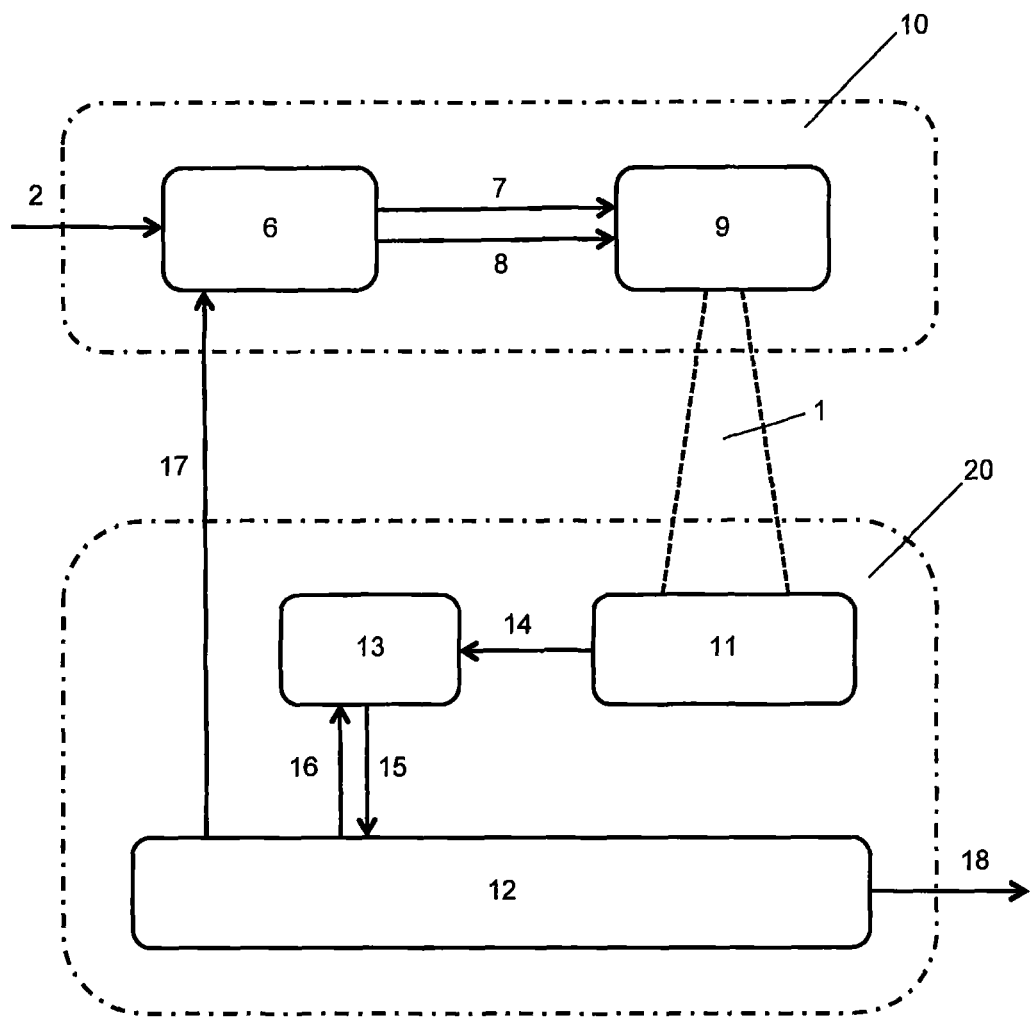
FIG. 1 is a diagram of the bidirectional wireless communication device that is the subject of the invention.

Refer to FIG. 1, which is a diagram of the bidirectional wireless communication device that is the subject of the invention. This device comprises an emission module 10 and a reception module 20. The emission module 10 makes it possible to encode source digital data 2, for example from the internet, to transmit them in the form of an amplitude— and/or phase-modulated light 1. For this, the light source 9, such as a light-emitting diode, is powered by a control means 6 which generates an electrical signal generally comprising a direct component 7 and an alternating component 8. The direct component 7 is used to bias said light-emitting diode 9 in order to produce the lighting function, and the alternating component 8 is derived from the digital/analog conversion of the source data 2. The reception module 20 is composed of a photodetector such as a photovoltaic module 11 which transforms the modulated light 1 into a modulated electrical signal 14, an electronic means 13 for matching the impedance of the photovoltaic module 11, and a processing module 12 for the electrical signal 15. The processing module 12 for the electrical signal 15 is capable of communicating with the control means 6 of the emission module 10 via the return channel 17, and with the member for managing the electronic impedance matching means 13 via the channel 16. The role of the electronic means 13 is to match the impedance of the photovoltaic module 11 which acts on the quality and the level of the electrical signal 15 in order to maximize the throughput of the data transmitted 18.

Figure 2A:
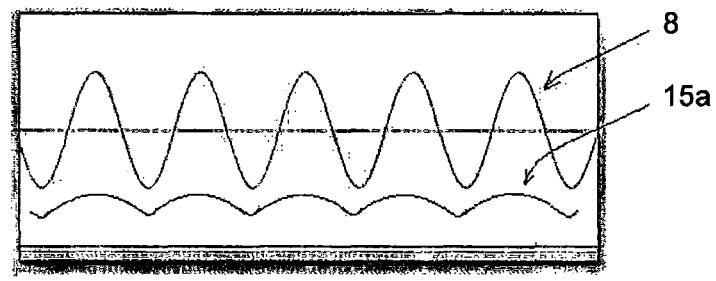
FIGS. 2a, 2b and 2c are reproductions of the screen of an oscilloscope which displays the curves representative of the alternating component of the electrical signal emitted by the control module and the electrical signal generated by a photovoltaic module, for different impedance values.
Figure 2B:
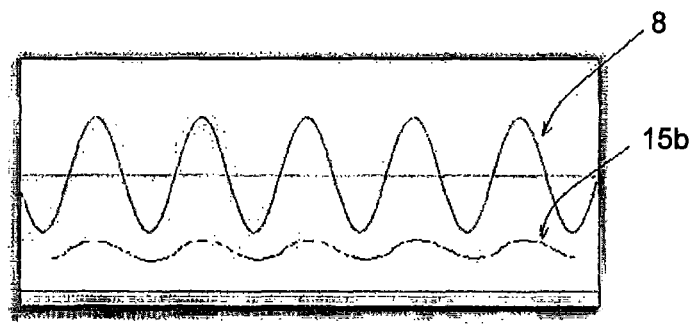
Figure 2C:
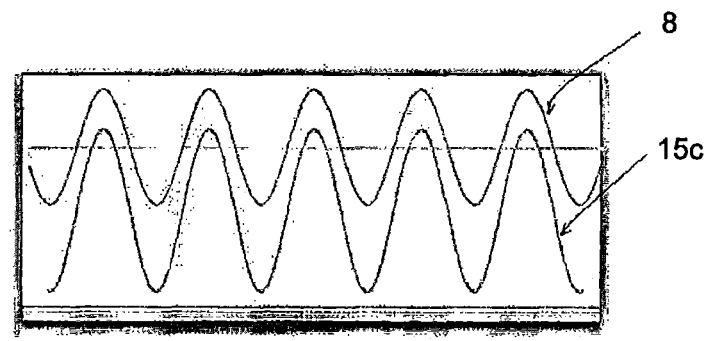

FIGS. 2a, 2b and 2c are reproductions of the screen of an oscilloscope which displays the curves representative of the alternating component 8 of the electrical signal emitted by the control module 6 at a frequency of 1 kHz and of the electrical signal 15 generated by the photovoltaic module 11 for different impedance values adjusted via the electronic means 13.

FIGS. 2a and 2b present two cases where the impedance matching is not optimized. The electrical signal 15a is distorted and its amplitude is too weak for the signal processing module 12 to be able to detect it (FIG. 2a). The quality and the level of the signal are not therefore acceptable for the communication to take place. The electrical signal 15b is not distorted, but its amplitude is too weak for the signal processing module 12 to be able to detect it (FIG. 2b). In this case, it is the level of the signal which limits the communication. FIG. 2c presents an optimized impedance matching, with an electrical signal 15c whose quality and level are good. This last configuration makes it possible to maximize the throughput of data transmitted 18.

Figure 3:
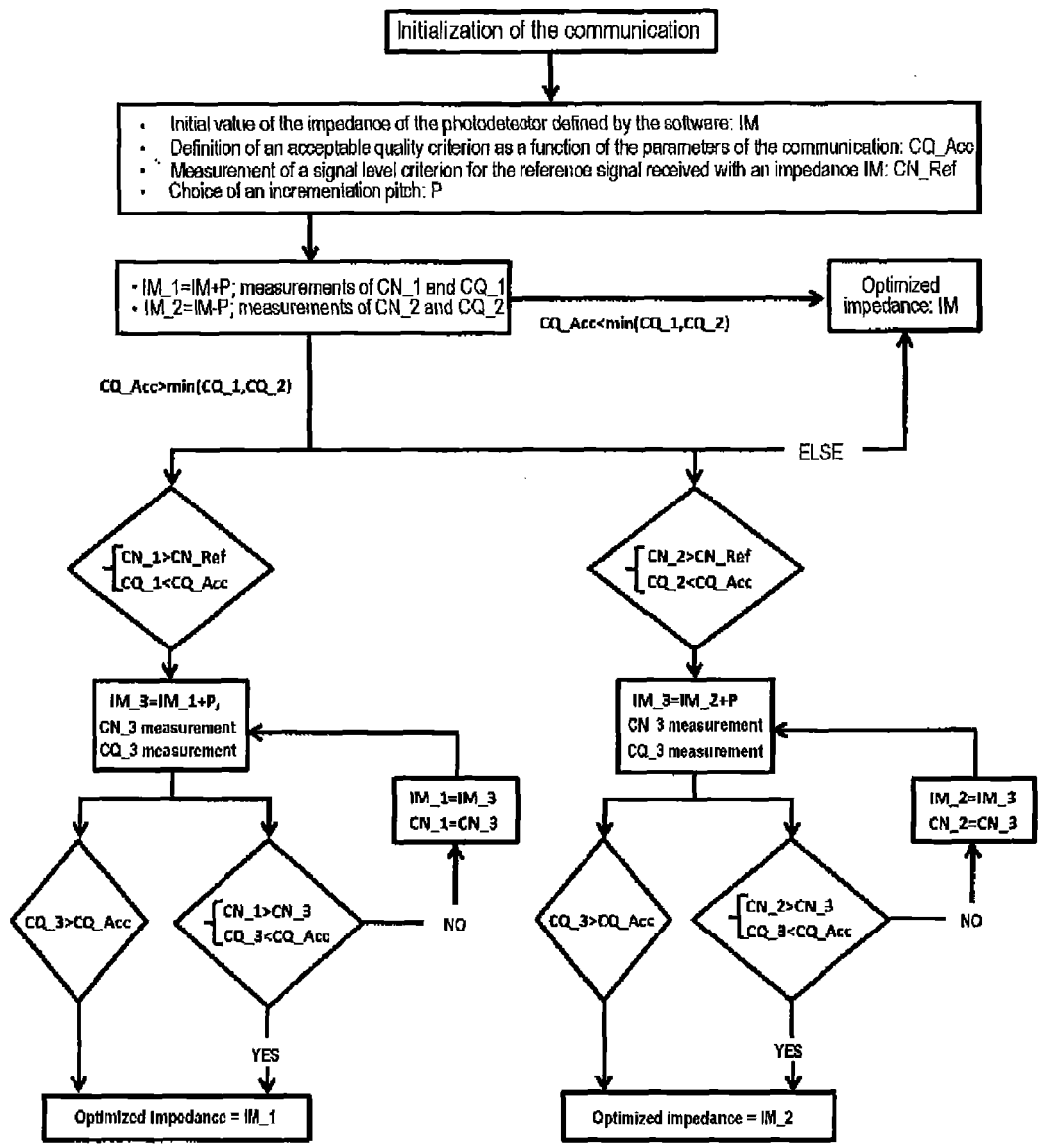
FIG. 3 is a flow diagram of a method for matching the impedance of the photovoltaic module of the wireless communication device that is the subject of the invention.
Figure 4:
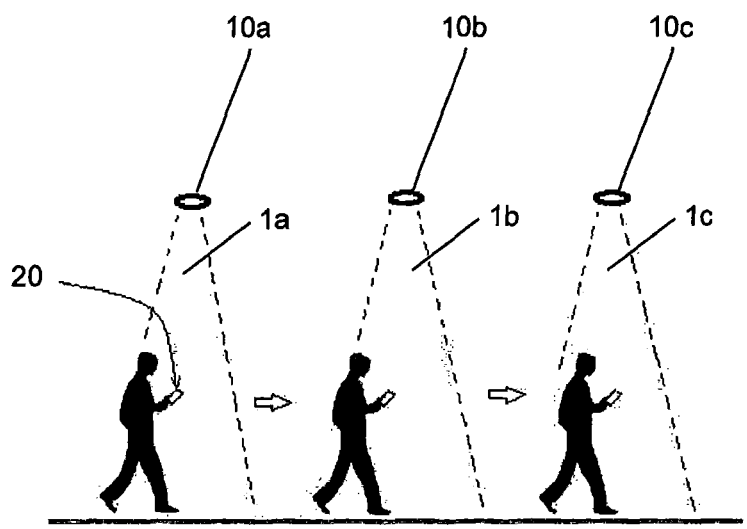
FIG. 4 illustrates a particular embodiment of the device that is the subject of the invention, in which the reception module is incorporated in a mobile object which successively receives several modulated lights from different light sources.

FIG. 3 is a flow diagram of a method for matching the impedance of the photovoltaic module of the wireless communication device that is the subject of the invention. To make it easier to understand the description of FIG. 3, the bit error ratio or the packet error ratio, that is thus sought to be minimized in this example, is taken for quality criterion (CQ) of the signal received. Also taken for level criterion (CN) is the signal-to-noise ratio. Said impedance matching method comprises the following steps:
1. initialization of the communication;
2. initialization of the system by:
   a. choosing the initial value of the impedance IM of the photovoltaic module defined by the impedance matching software as a function notably of the nature of the photodetector and of the type of modulation;
   b. defining an acceptable quality criterion CQ_Acc as a function of the parameters of the communication such as the throughput, the type of modulation or the illumination;
   c. measuring a signal level criterion CN_Ref for the reference signal received with an initial impedance IM;
   d. choosing the incrementation pitch P, whose value can be real or imaginary;
3. impedance matching algorithm comprising the following steps:
   a. initialization of the impedance matching;
      i. initialization of the value IM_1 equal to the value IM+P;
         measurement of CN_1 (corresponding to the value of IM_1)

measurement of CQ_1 (corresponding to the value of IM_1)
ii. initialization of the value IM_2 equal to the value IM-P;
   measurement of CN_2 (corresponding to the value of IM_2)
   measurement of CQ_2 (corresponding to the value of IM_2)
b. impedance matching:
   i. if CQ_Acc>min(CQ_1, CQ_2)
      if CN_1>CN_ref and CQ_1<CQ_Acc
         initialization* of the value IM_3=IM_1+P
            measurements of the values CN_3 and CQ_3
               if CN_1<CN_3 and CQ_3<CQ_Acc then IM_1=IM_3 and CN_1=CN_3 and the process resumes at the step of initialization* of the value IM_3=IM_1+P
               if CN_1>CN_3 and CQ_3<CQ_Acc then the impedance is optimized and has the value IM_1
               if CQ_3>CQ_Acc
                  then the impedance is optimized and has the value IM_1
      if CN_2>CN_Ref and CQ_2<CQ_Acc
         initialization** of the value IM_3=IM_2+P
            measurements of the value CN_3 and CQ_3
               if CN_2<CN_3 and CQ_3<CQ_Acc then IM_2=IM_3 and CN_2=CN_3 and the process resumes at the step of initialization** of the value IM_3=IM_2+P
               if CN_2>CN_3 and CQ_3<CQ_Acc then the impedance is optimized and has the value IM_2
               if CQ_3>CQ_Acc
                  then the impedance is optimized and has the value IM_2
      else the optimized impedance has the value IM
   ii. if CQ_Acc<min(CQ_1, CQ_2)
      the impedance is optimized and the value of this impedance is equal to IM FIG. 4 illustrates a particular embodiment of the device that is the subject of the invention, in which the reception module 20 is incorporated in a mobile object which successively receives during its movements, several modulated lights (1a, 1b, 1c) derived from different emission modules (10a, 10b, 10c) and whose frequency and/or phase modulations can be different. That illustrates the capacity of the reception module 20, by virtue of the impedance matching function of the photovoltaic module 11, to universally decode source data transmitted by different emission modules (10a, 10b, 10c).

ADVANTAGES OF THE INVENTION

Ultimately, the invention meets the aims set well by making it possible to improve the quality and the level of the signal received by a photodetector, which makes it possible to increase the data transmission throughputs and/or to be able to successively decode information transmitted by different emission modules.

The invention claimed is:

1. A bidirectional wireless communication device based on the use of light, comprising:
   (a) one or more emission modules, each emission module including:
      a light source powered by a control means and emitting an amplitude-and/or phase-modulated light;
      a control means which generates an electrical signal derived from digital/analog conversion of source data to be transmitted; and
   (b) a reception module including:
      a photodetector illuminated by said modulated light and generating a modulated electrical signal in response to said modulated light;
      a processing module for the signal generated by said photodetector and configured to directly communicate with the control means of the emission module via a return channel;
   wherein the reception module further includes an electronic means connected between the photodetector and the signal processing module and configured to (i) minimize distortions of said modulated electrical signal linked to a poor impedance matching at an output of the photodetector in order to maximize the signal-to-noise ratio of the modulated electrical signal, and (ii) maximize the level of the modulated electrical signal and the throughput of transmitted data.

2. The wireless communication device as claimed in claim 1, wherein said photodetector is a photovoltaic module capable of producing an electrical charge or power supply current.

3. The wireless communication device as claimed in claim 1, wherein said electronic means comprises:
   physical components of variable values, such as capacitors, inductors and/or resistors;
   an electronic module for managing said physical components.

4. The wireless communication device as claimed in claim 1, wherein the electrical signal generated by said control module comprises a direct component and an alternating component.

5. The wireless communication device as claimed in claim 1, wherein said modulated light is an incoherent or coherent light, emitted respectively by a light source such as a light-emitting diode or a laser diode.

6. The wireless communication device as claimed in claim 1, wherein said modulated light is emitted by the light source in wavelength ranges corresponding to the visible, to the ultraviolet and/or to the infrared.

7. The wireless communication device as claimed claim 1, wherein said source data can be a reference signal or communication data.

8. The wireless communication device as claimed in claim 1, wherein said device comprises a plurality of emission modules which emit modulated lights with different modulation characteristics, the photodetector being incorporated in a mobile object which successively receives one or another of said modulated lights and having an electronic impedance matching means capable of maximizing the throughput of data transmitted by each of said emission modules.

9. A method for minimizing distortions of said modulated electrical signal linked to a poor impedance matching at an output of the photodetector of the wireless communication device as claimed in claim 1, wherein the method comprises:
   (a) initializing, by at least one emission module of the wireless communication device, the communication;
   (b) setting, by the electronic means of the reception module of the wireless communication device, an initial impedance value, said value being a function of the nature of the photodetector;

(c) setting a criterion representative of the quality of the electrical signal received which is acceptable for the communication, denoted an acceptable quality criterion;

(d) adjusting the impedance of the photodetector by successive increments so as to maximize the criterion representative of the level of the electrical signal received, as long as the criterion representative of the quality of the electrical signal received is better than the acceptable quality criterion; and (e) transmitting the modulated light signal containing the communication data.

10. The method of claim 9, wherein the initialization of the communication comprises transmitting, via the emission module, a header signal associated with a reference signal known to the reception module.

11. The method of claim 9, wherein the criterion representative of the quality of the signal transmitted is a characteristic of a Fourier transform, a bit error ratio, a frame error ratio or a packet error ratio of the signal transmitted.

12. The method of claim 9, wherein the criterion representative of the level of the signal transmitted is a signal-to-noise ratio, a peak-peak amplitude, a maximum amplitude or a minimum amplitude of the signal transmitted.

13. The method of claim 9, wherein the adjustment of the impedance of the photodetector by successive increments so as to reach a targeted criterion comprises:

(a) choosing an incrementation pitch;

(b) measuring the criteria representative of the quality or of the level of the electrical signal received respectively for the reference signal, for the signal received with an impedance equal to the initial impedance plus the incrementation pitch and for the signal received with an impedance equal to the initial impedance minus the incrementation pitch;

(c) comparing the criteria representative of the quality or of the level of the electrical signal received two-by-two, by setting an impedance value corresponding to the targeted criterion and by taking, for a new reference signal, the electrical signal received with said impedance value;

(d) repeating the steps of measurement and of comparison of bit error ratios or of signal-to-noise ratios by an iterative method, until the targeted criterion is reached by the reference electrical signal.

14. A method for minimizing distortions of said modulated electrical signal linked to a poor impedance matching at an output of the photodetector of the wireless communication device as claimed in claim 1, wherein the method comprises:

(a) initializing the communication;

(b) setting, by the electronic means of the reception module of the wireless communication device, an initial impedance value, said value being a function of the nature of the photodetector;

(c) adjusting the impedance of the photodetector by successive increments so as to improve the criterion representative of the quality of the electrical signal received, said better criterion representative of the quality of the electrical signal received being denoted an optimized quality criterion with an impedance defined as a pre-optimized impedance;

(d) adjusting the pre-optimized impedance of the photodetector by successive increments so as to maximize the criterion representative of the level of the electrical signal received, as long as the criterion representative of the quality of said electrical signal received is better than the optimized quality criterion; and (e) transmitting the modulated light signal containing the communication data.

* * * * *